United States Patent [19]

Peck

[11] Patent Number: 5,555,533

[45] Date of Patent: Sep. 10, 1996

[54] CONTROL SYSTEM FOR DIVER VOX/PTT COMMUNICATION SYSTEM

[75] Inventor: Jerome Peck, Mission Viejo, Calif.

[73] Assignee: Peck/Pelissier a California Partnership, Costa Mesa, Calif.

[21] Appl. No.: 352,362

[22] Filed: Dec. 9, 1994

[51] Int. Cl.⁶ .................................................. H04B 11/00
[52] U.S. Cl. ........................................ 367/132; 367/901
[58] Field of Search ...................................... 367/132, 901

[56] References Cited

U.S. PATENT DOCUMENTS

| | | | |
|---|---|---|---|
| 3,789,353 | 1/1974 | Hunter et al. | 367/132 |
| 4,096,466 | 6/1978 | Johnson | 367/132 |
| 4,471,492 | 9/1984 | Mann et al. | 455/73 |
| 5,136,555 | 8/1992 | Gardos | 367/132 |

OTHER PUBLICATIONS

Vermula et al., "A novel voice activated switch (VOX) for high noise environments", Proc. of the IEEE 1985 National Aerospace and Electronics Conference NAECON 1985, vol. 1, pp. 56–60.

*Primary Examiner*—Ian J. Lobo
*Attorney, Agent, or Firm*—G. Donald Weber, Jr.

[57] ABSTRACT

A control system which enables a diver to electronically switch between voice operated (VOX) operation and push-to-talk (PTT) operation by actuation of the existing momentary contact PTT switch used in most diver communication systems. A counter and multivibrator arrangement is employed to alternate between PTT and VOX modes in response to a pair of quick depressions of the PTT switch within a pre-determined time. An audio tone having a duration which identifies which mode of operation has been enabled is also generated and is available for input to the diver's earphone amplifier. The control system includes a frequency selective VOX enabling circuit which takes advantage of the repetition of vowel pitch pulses found in human speech. The circuit continually locks onto these pulses when they last for a few cycles but ignores noise (as found in diving masks) which has only random spikes without the periodic repetition of vowel frequencies in speech. The control system employs filtering and a low cost phase locked loop (PLL) integrated circuit to lock onto these periodic signals found in the diver's voice signature. A lock detection circuit provides a positive output signal which is used to enable transmission each time a valid series of vowel pitch pulses is detected. In a second embodiment, three quick depressions of the PTT switch within the predetermined time, allow the control of a third function, such as high frequency/low frequency operation, in addition to switching between PTT and VOX modes. An audio tone having a pitch which identifies whether high or low frequency mode of operation has been enabled is also generated and is available for input to the diver's earphone amplifier.

26 Claims, 2 Drawing Sheets

CONTROL SYSTEM FOR DIVER VOX/PTT COMMUNICATION SYSTEM

BACKGROUND

1. Field of the Invention

This invention relates in general to underwater communication systems and, in particular, to a system for controlling voice operated transmission and push-to-talk transmission in a diver communication system.

2. Prior Art

Voice operated transmitters (VOX) are not new to electronics technology or even to diver communication systems. However, when applying conventional technology to the underwater environment, there are many problems. Because the diver is wearing a mask, there are very high levels of noise that can "fool" a conventional VOX system into activation. This unwanted activation by non-voice signals is called "false triggering". The tendency of divers to blow directly into the microphone while swimming or working makes voice activation a particularly difficult problem.

When a diver experiences false triggering, one possible approach is to adjust the microphone sensitivity in an attempt to reduce the susceptibility of the system to activation by extraneous noises. This technique is generally unsatisfactory because it requires the diver to make a manual adjustment. A satisfactory adjustment of the microphone sensitivity is cumbersome and difficult to achieve because manual dexterity is limited in the underwater environment where gloves are commonly used. Moreover, the wide range of frequencies and variations in loudness that can cause false triggering may mean that there is no optimum sensitivity. Thus, this technique may result in degraded voice activation because of lowered microphone sensitivity but not necessarily less false triggering.

Some communication systems have employed external switches that enable the diver to disable VOX operation. If the diver is having problems with false triggering, he can switch to a manual push-to-talk (PTT) mode of operation. However, the use of external mechanical switches offers flexibility only at the expense system reliability. One prior system described in U.S. Pat. No. 5,136,555 to Gardos uses a complicated three-position switch for switching between VOX mode and PTT mode. In that system, VOX operation is enabled by pulling the switch outward to a first switch position. PTT reception is enabled by placing the switch in a central or second switch position. An additional depression of the switch to a third or inward position enables PTT transmission.

In general, the harshness and hazards of the underwater environment require a control system which is simple to operate and in which exposure of the equipment to the harsh and hazardous external environment is limited as much as possible. The use of additional or complicated mechanical switches which are exposed to this undersea environment or the use of diver-operated adjustments increases the possibility of malfunctions and presents additional undesirable demands on the attention of the diver.

SUMMARY OF THE INVENTION

It is therefore an object of the present invention to provide an improved diver voice communication system having push-to-talk and VOX modes of operation.

Another object is to reduce or eliminate false triggering in the VOX mode of operation.

Another object is to provide a VOX activation circuit which is insensitive to the diver's breathing or blowing into the microphone and other non-speech sounds associated with diving such as regulator noises and bubbles.

Another object is to allow switching between VOX or PTT mode of operation without the reliability problems associated with complicated mechanical switches in the ocean environment.

A further object is to minimize the need for the diver to make adjustments to the diver voice communication system to reduce false triggering.

Still another object is to provide a diver communication control system in which the switching between PTT mode and VOX mode is simply and easily accomplished by the diver.

Still another object is to provide the diver with an audio indication whether the communication system has been switched to the push-to-talk mode or the VOX mode.

A further object is to allow switching of a diver communication system between high frequency operation and low frequency operation without the reliability problems associated with complicated mechanical switches in the ocean environment and which is accomplished simply and easily.

Yet another object is to provide the diver with an audio indication whether the communication system is in high frequency operation or low frequency operation.

These and other objects are provided by the control system of the present invention which enables the diver to electronically switch between VOX operation and push-to-talk operation by actuation of the existing momentary contact push-to-talk switch used in most diver communication systems. No additional mechanical switches are required—the only mechanical switch is the same switch that is currently depressed during push-to-talk transmission. An audio signal is provided which indicates whether the VOX or PTT mode has been enabled. The control system employs a counter and multivibrator arrangement to alternate between PTT and VOX modes in response to a pair of quick depressions of the PTT switch within a pre-determined time (such as 500 milliseconds). An audio tone having a duration which identifies which mode of operation has been enabled is also generated and is available for input to the diver's earphone amplifier.

The control system includes a VOX enabling circuit which is frequency selective. The VOX enabling circuit is sensitive to frequencies in the human voice spectrum but is insensitive to frequencies outside the voice spectrum. Because the control system is frequency selective, the VOX operation ignores the extraneous high frequency or loud noises found in the diving mask environment but tracks the speech of the diver. The VOX enabling circuit takes advantage of the repetition of vowel pitch pulses found in human speech and is designed to follow and lock onto these periodic signals. The circuit continually locks onto these pulses when they last for a few cycles. As long as there is a new lock within a few milliseconds of the last lock, the VOX operation remains in the activated state. On the other hand, noise (as found in diving masks) which has only random spikes without the periodic repetition of vowel frequencies in speech is ignored by the control system. The control system employs filtering and a low cost phase locked loop (PLL) integrated circuit to lock onto these periodic signals found in the diver's voice signature. By coupling the PLL output to a lock detection circuit, a positive output signal is provided each time a valid series of pitch pulses is detected which is used to enable transmission.

In a second embodiment of the control system of the present invention, in addition to providing frequency-selective VOX enabling circuitry and electronic switching between VOX operation and push-to-talk operation by two quick depressions of the PTT switch within a predetermined time, three quick depressions of the PTT switch within the predetermined time will provide an additional control signal that may be used to switch the communication system between high and low frequency operation (or to accomplish another function, if desired). An audio tone having a low pitch or a high pitch (which identifies whether low frequency operation or high frequency operation, respectively, has been enabled) is also generated and is available for input to the diver's earphone amplifier.

A more complete description of the present invention is to be found in the following detailed description of the preferred embodiment when considered in conjunction with the accompanying drawings, wherein like reference characters represent like parts throughout the several views and wherein:

DESCRIPTION OF THE PREFERRED EMBODIMENTS

Figure 1:
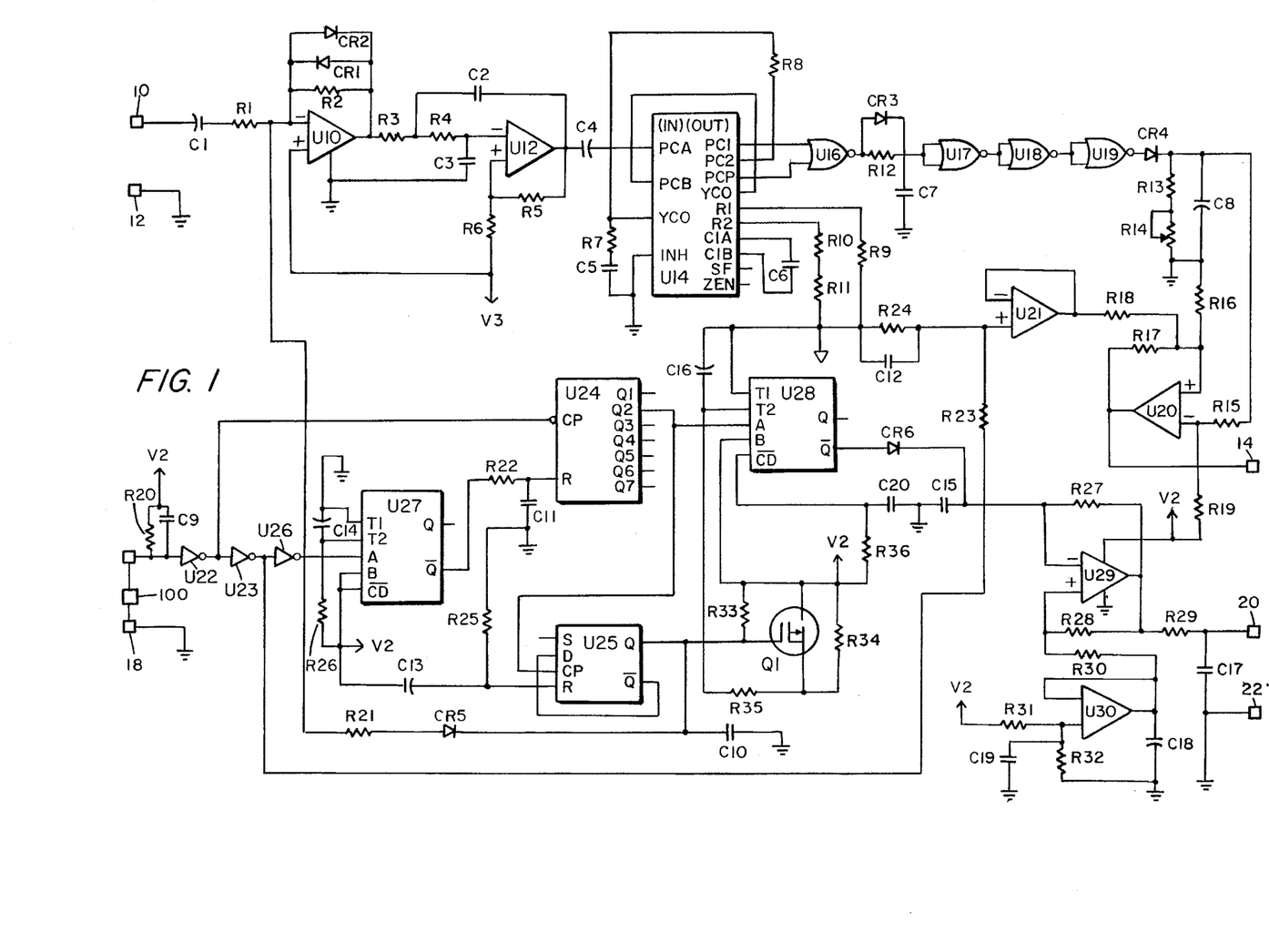
FIG. 1 is a schematic diagram of a preferred embodiment of a PTT/VOX control system according to the present invention.

The control system for diver PTT/VOX communication of the present invention as illustrated in the embodiment of FIG. 1 has two aspects. The first aspect is a VOX control circuit in which VOX operation is enabled only in response to the diver's speaking and is not responsive to random and or extraneous signals. This aspect takes advantage of the repetition of vowel pitch pulses found in human speech. Vowel pitch pulses are typically in the 100 Hz to 700 Hz frequency range and these frequencies tend to be emphasized by the natural resonance of the divers mask. The second aspect of the control system allows switching between PTT and VOX operation through use of the push-to-talk switch. That is, a single momentary contact switch establishes the PTT mode of operation or the VOX mode of operation or enables transmission during the PTT mode.

Figure 2:
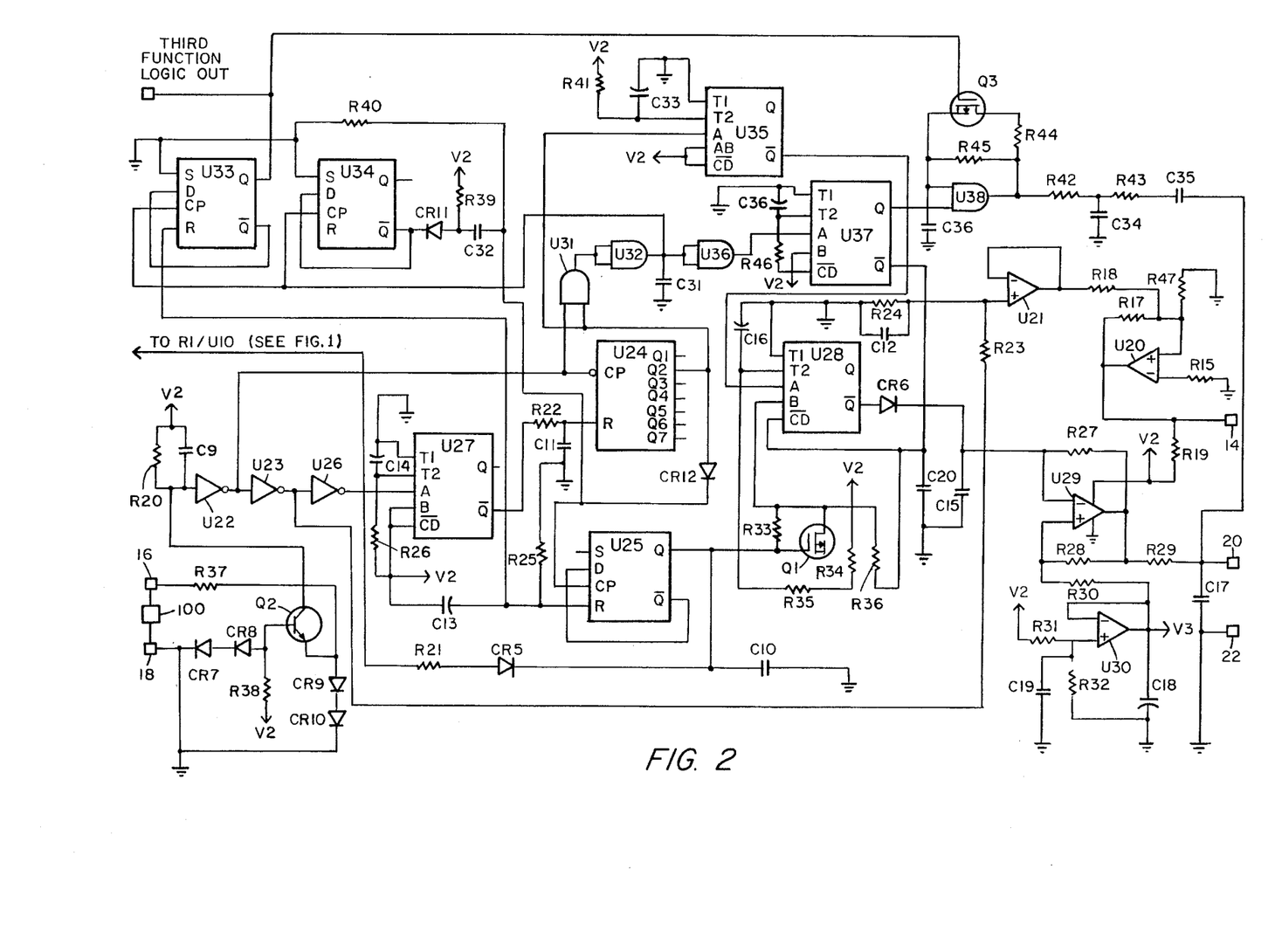
FIG. 2 is a schematic diagram illustrating an alternate preferred embodiment of a PTT/VOX/OPERATING FREQUENCY control system according to the present invention.

The embodiment of FIG. 2 expands the second aspect of the control system to also allow switching between low frequency operation and high frequency operation through use of the push-to-talk switch.

Referring now to the FIG. 1 which shows a schematic diagram of a preferred embodiment of the present invention. In the VOX enabling circuitry, the microphone is coupled to terminals 10 and 12, respectively. Terminal 12 is coupled to circuit ground. The microphone signal at terminal 10 is coupled through capacitor C1 and resistor R1 connected in series to the inverting input of a operational amplifier U10. The non-inverting input of amplifier U10 is connected to a suitable reference potential, for example V3. Amplifier U10 is configured for high gain but has its output limited by diode CR1, diode CR2 and resistor R2 connected in parallel in a feedback loop to the inverting input. The output of amplifier U10 is coupled through resistor R3 and resistor R4 in series, to the inverting input of a second operational amplifier U12 operating as a low pass filter.

Amplifier U12 is configured as an equal component Sallen and Key low pass filter having a cutoff frequency set at 700 Hz. The output of amplifier U12 is coupled in a first feedback path through a capacitor C2 to the connection between resistor R3 and resistor R4 and in a second feedback path to the noninverting input of amplifier U12 through resistor R5. The non-inverting input of the amplifier U12 is also coupled through resistor R6 to the reference potential V3. The inverting input of amplifier U12 is coupled via capacitor C3 to circuit ground.

The output of amplifier U12 is connected by a capacitor C4 to the signal input (PCA input) of a phase-locked loop (PLL) integrated circuit U14 (in this embodiment, includes an internal voltage controlled oscillator "VCO"). The components that are associated with the PLL set the VCO frequency, the loop filter characteristics and the loop damping. The oscillator frequency is set to capture at 100 Hz and 700 Hz and to lock at 150 Hz and 650 Hz. This range is ideal because it covers the vowel spectrum of speech.

Turning now to the specific connections of the PLL integrated circuit U14, the VCO input terminal is coupled through resistor R7 and capacitor C5 to circuit ground. The INH input terminal is also coupled to circuit ground. The VCO output terminal is coupled back to the PCB input terminal and the PC2 output terminal is coupled via resistor R8 to the VCO input terminal. The CIA output and the C1B input terminals are joined together through capacitor C6 while the R1 output and R2 output terminals are coupled to circuit ground through resistor R9, and resistors R10 and R11 in series, respectively. The PC1 output and the PCP output terminals are each coupled to an input of Nor gate U16.

When the diver is speaking, the PC1 and PCP outputs are pulse trains that are generated as the PLL attempts to lock on to the changing vowel frequencies in the diver's speech. The PLL operation will be described in more detail hereinafter in connection with the description of the operation of the invention.

The output of NOR gate U16 is rectified via resistor R12 in parallel with forward-biased diode CR3 and is coupled to both inputs of NOR gate U17. The inputs to NOR gate U17 are also coupled to circuit ground via capacitor C7 to provide additional filtering of any PLL output pulses corresponding to noise signals. The output of NOR gate U17 is in turn coupled to each input of NOR gate U18 which has its output coupled to the inputs NOR gate U19.

The output of NOR gate 19 is coupled via diode CR4 to capacitor C8 to integrate the pulses to a DC level. Capacitor C8 is connected in parallel with the series combination of resistor R13 and variable resistor R14 coupled to circuit ground to control the rate of decay of the voltage at capacitor C8. The voltage at capacitor C8 will decay when the pulses from the PLL are not being generated, for example during a pause or break in the diver's speech. The positive side of capacitor C8 and the output of diode CR4 are coupled by a resistor R 15 to the inverting input of an operational amplifier U20. The non-inverting input amplifier of U20 is coupled through a resistor R16 to circuit ground and to a feedback loop from the amplifier output through resistor R17.

Amplifier U20 operates as a comparator. The bias voltage for amplifier U20 is provided by the output of an operational amplifier U21 which is coupled via resistor R18 to the non-inverting input of amplifier U20. The inverting input of amplifier U20 is also coupled to the circuit V2 supply through resistor R19. The output of amplifier U20 is coupled to the switching logic of the transmitter represented by terminal 14.

Turning now to the VOX/PTT switching circuitry of the present invention, the push-to-talk (PTT) switch (100) has its signal side coupled to terminal 16 and its return side coupled to terminal 18 (circuit ground) such that the closure of the PTT couples terminal 16 to circuit ground. The circuit V2 supply voltage is coupled to terminal 16 via resistor R20 and capacitor C9 connected in parallel. Terminal 16 is also coupled to the input of a first inverter U22, which has its output coupled to the input of a second inverter U23 and also to the signal input (CP) of a counter U24. Resistor R20 is the pull up resistor for the first inverter U22 and capacitor C9 is a bypass capacitor to help remove contact noise from the PTT switch. The Q2 output of the counter U24 is coupled to the CP input of a D flip-flop U25. The Q output of flip-flop U25 is coupled via capacitor C10 to circuit ground and via reverse-biased diode CR5 and resistor R21 to the non-inverting input of operational amplifier U10 (i.e., to the microphone audio signal input path to the control system). The $\overline{Q}$ output of flip flop U25 is coupled back to its D input.

The output of the second inverter U23 is coupled to the input of a third inverter U26 which has its output coupled to the trigger input A of monostable multivibrator U27. The $\overline{Q}$ output of the first monostable multivibrator U27 is coupled via resistor R22 to the reset input of counter U24 which is also connected to circuit ground via capacitor C11. The output of the second inverter U23 is also coupled via resistor R23 to the non-inverting input of bias supply amplifier U21 which provides the bias supply for comparator U20. This non-inverting input of amplifier U21 is also coupled to circuit ground through resistor R24 and capacitor C12 connected in parallel.

The reset input of flip flop U25 is coupled through resistor R25 to circuit ground and through capacitor C13 to the V2 supply. The V2 supply is also coupled via resistor R26 to terminal T2 and directly to terminals B and $\overline{CD}$ of the first monostable multivibrator U27. Terminal T1 of multivibrator U27 is coupled directly to circuit ground. Terminal T2 of multivibrator U21 is connected to circuit ground through capacitor C14.

The Q2 output of counter U24 is also coupled to the trigger input (A) of a second monostable multivibrator U28. The $\overline{Q}$ output of the second multivibrator U28 is coupled via diode CR6 to the inverting input of an audio oscillator U29. The output of CR6 is also coupled to circuit ground via capacitor C15. The input terminals T1 and T2 of the second multivibrator U28 are coupled to ground and to ground via capacitor C16, respectively. The output of audio oscillator U29 is fed back to its inverting input via resistor R27 and to the non-inverting input via resistor R28. The output of audio oscillator U29 is also coupled via resistor R29 to an audio signal terminal 20. Audio return terminal 22 is coupled to circuit ground. Capacitor C17 is coupled between the audio terminal 20 and return terminal 22.

An amplifier U30 supplies bias voltage V3 to the non-inverting input of audio oscillator U29 via resistor R30, the non-inverting input of the first operational amplifier U10, and the non-inverting input of operational amplifier U12 via resistor R6. The output of bias amplifier U30 also is coupled by a capacitor C18 to circuit ground and also fed back directly to its inverting input. The non-inverting input is coupled to the V2 supply via resistor R31 and to circuit ground via resistor R32 and capacitor C19 in parallel.

The Q output of flip flop U25 is also coupled to the gate of a MOS field-effect transistor Q1 and to the V2 supply through resistor R33. The V2 supply voltage is coupled to the source of FET Q1 via resistor R34 of voltage divider R34 and R35. The other side of resistor R35 is coupled to the T2 input of the second monostable multivibrator U28. The V2 supply voltage is further coupled directly the B input of monostable multivibrator U28 and also via resistor R36 to the $\overline{CD}$ input of multivibrator U28 which is also coupled by capacitor C20 to circuit ground.

OPERATION OF THE PREFERRED EMBODIMENT OF FIG. 1

In operation, in accordance with well known conventional diver communications system design principals, a moisture sensing switch is activated to apply power to the system when the diver enters the water. The V2 supply via capacitor C13 and resistor R25 resets flip flop U25 to insure that the control system is placed in the PTT mode upon application of power. At initial startup, the Q output of flip flop U25 is set low and the bias current at the inverting input of the first operational amplifier U10 is shunted through resistor R21 and diode CR5 through the internal impedance of the output transistors of the flip flop U25. This causes the operation of amplifier U10 to be non linear with its output being forced toward the V2 supply voltage. When the amplifier U10 is in non linear operation, it will not operate as an audio amplifier. Therefore the amplifier U10 is switched off, disabling the VOX mode.

PTT/VOX selection is triggered by two momentary closures of the PTT switch (i.e., the PTT switch is quickly depressed and released two times) which couples terminal 16 and terminal 18. When the PTT switch is depressed, a low condition is presented at terminal 16 (PTT input) which causes the output of the first inverter U22 to go high. A momentary depression of the PTT switch causes a positive pulse at the output of the first inverter U22. This pulse is passed to the counter U24 which causes its Q1 output to go high. A second momentary depression of the PTT switch will couple a second pulse to the counter U24 which causes its Q2 output to go high.

Concurrently, the switch pulses are coupled through the second and third inverters, U23 and U26, respectively, and emerge as a positive going pulses at the output of the third inverter U26. The first positive going pulse triggers the first monostable multivibrator U27 to produce a 500 millisecond pulse at its Q output and, simultaneously with the conclusion of the 500 millisecond pulse from its Q output, produce a positive going pulse at its $\overline{Q}$ output which resets counter U24. The time constant of multivibrator U27 is set by resistor R26 and capacitor C14. Resistor R22 and capacitor C11 serve to prevent false reset spikes to the reset input of counter U24. The second pulse is ignored by the monostable multivibrator U27 if it arrives before the multivibrator is reset at the end of the 500 milliseconds pulse.

An additional circuit path is taken from the output of the second inverter U23. When the PTT switch signal is low, the output of inverter U23 is also low. This low signal at the output of inverter U23, is coupled to the non-inverting input of bias supply U21 to produce a low at the output of bias supply U21. When the output of bias supply U21 goes low, it causes the output of the comparator U20 to also go low. Thus the output of comparator U20 is held low for the duration of any PTT switch closure. The output of the comparator U20 is in turn used to activate switching logic 14 with a low signal enabling the associated transmitter. The transmitter is therefore enabled whenever the PTT switch is depressed regardless of the mode of operation of the control system. Correspondingly, a high output of the comparator U20 may enable the associated receiver.

In PTT mode, when the PTT switch is depressed two times before the counter U24 is reset by the trailing edge of the pulse from the monostable multivibrator 27, a high signal will appear at the Q2 output of counter U24. This positive transition at the Q2 output is coupled to the trigger input (CP) of the flip flop U25 and causes the Q output of the flip flop to go high from its previous low level.

This high level at the Q output of flip flop U25 causes the diode CR5 to become reverse biased and breaks the shunt path of the bias current from the inverting input of operational amplifier U10, thereby restoring the linear operation of amplifier U10 and enabling the VOX mode. Thus if the control system is in the PTT mode, and the PTT switch is rapidly depressed two times within 500 milliseconds, the microphone audio signals appearing at terminals 10 and 12 are amplified by the first operational amplifier U10.

The Q2 output of U24 and the Q output of U25 are also coupled to provide an audio signal indicating the mode of operation of the communication system. The positive transition of Q2 triggers the second 500 millisecond monostable multivibrator U28. Monostable multivibrator U28 was cleared during power-up through resistor R36 and capacitor C20. The audio oscillator U29 is prevented from oscillating when there is a high level appearing at the anode of diode CR6 which is produced when there is a high level at the $\overline{Q}$ output of monostable multivibrator U28. Thus, at initial application of power to the communication system when the diver enters the water, the audio oscillator U29 is prevented from oscillating by the high level of the $\overline{Q}$ output of multivibrator U28.

When a high appears at the Q2 output of counter U24 as a result of the two quick depressions of the PTT switch, the $\overline{Q}$ output of monostable multivibrator U28 low which enables the audio oscillator U29 for a time period set by capacitor C16 and resistors R34 and R35. The transistor Q1 coupled across resistor R34 controls the duty cycle of one shot multivibrator U28. Transistor Q1 is activated when the Q output of flip flop 25 goes low.

If the control system is in the PTT mode, the two rapid depressions of the PTT switch produce a high level at the Q2 output of counter U24 which in turn produces a high level at the Q output of flip flop U25. This high level causes transistor Q1 to be an open circuit for the duty cycle of the monostable multivibrator U28 as set by C16, R34 and R35. The audio oscillator U29 is enabled for the duration of the signal produced by one shot U28.

If the control system is the VOX mode, when the push-to-talk switch is depressed rapidly two times to switch to the PTT mode, a positive-going transition of Q2 of the counter U24 causes the Q output of flip flop U25 to go low which in turn activates transistor Q1. With transistor Q1 activated, a short is placed across R34 which causes monostable multivibrator U28 to have a shorter duty cycle and in turn enables the audio oscillator U29 for a shorter period than when the control system was switched to VOX mode. The audio signal is available from audio terminal 20 for input to the ear phone amplifier of the diver communication system.

Turning to the operation of the VOX enabling circuitry and assuming the control system is now in the VOX mode, output Q1 of flip flop U25 is high and the microphone audio input signal is coupled to the limiting operational amplifier U10. The amplified, limited signal from amplifier U10 is filtered in Sallen and Key low pass filter U12 and applied to the input of the phase lock loop integrated circuit U14. As previously noted, the VCO frequency of PLL U14 is set to capture at 100 Hz and 700 Hz and to lock at 150 Hz and 650 Hz.

The PLL tracks signals on its PCA input. An internal phase comparator produces an error voltage on the PC1 output directly proportional to the phase difference of the incoming speech signal and the voltage controlled oscillator. As in most PLL circuits, this voltage is used to drive the VCO frequency in a direction that causes the comparator output of the PLL circuit to become an open circuit. This open circuit causes the voltage at the loop filter capacitor C6 to stabilize.

When the frequency of the input signal does not match the VCO frequency, an error voltage in the form of a pulse train appears at the PC1 output of the PLL circuit. When the PLL enters lock, the error voltage on the PC1 output is removed and a second pulse train at the PCP output also disappears, leaving both outputs in a low state.

When PLL is in lock, both inputs to the first NOR gate U16 are low which produces a high at the output of NOR gate U16. Since the lock period is only for short intervals corresponding to the random lock of the PLL to the varying speech signals, a pulse train is produced at the output of NOR gate U16. This pulse train is rectified via diode CR3 and filtered by capacitor C7. Values of resistor R12 and capacitor C7 are selected to optimize only those pulses that correspond to speech signals and de-emphasize those pulses that correspond to noise pulses. The optimized pulse train is propagated through NOR gates U17 and U18 until it emerges at the output of the fourth NOR gate U19. The pulses pass through diode CR4 and capacitor C8 which integrates the pulses to a DC level.

The output of the comparator U20 goes low when the voltage across capacitor C8 rises to provide a voltage at the inverting input of comparator U20 above the voltage level at the noninverting input of comparator U20. The noninverting input of comparator U20 is supplied through the amplifier U21 operating as a supply follower. That is, when the push-to-talk switch is not depressed, the voltage applied to resistor R23 (approximately 8 volts) from inverter U23 is divided by resistor R23 and R24 and applied to the noninverting input of amplifier U21. This forces the output of amplifier U21 to approximately 4 volts. This voltage is divided via R18 and R16 and coupled to the noninverting input of comparator U20. When the output of comparator U20 is high, the feedback voltage across resistor R17 is added to the voltage across resistor R16 resulting in a voltage of approximately 2.1 volts at the noninverting input. The inverting input to comparator U20 is biased at approximately 0.6 volts as set by resistors R14, R19, R15, R13 and Trimmer resistor R14. The setting of the trimming resistor allows variation of this threshold voltage as well as adjusting the time constant of capacitor C8.

When the PTT switch is depressed which brings the noninverting input of supply follower U21 low, the voltage reference at the noninverting input of the comparator U20 will be approximately 0.4 volts via the feedback resistor R17. Therefore, when the PTT switch is depressed, the noninverting input of comparator U20 is brought lower than its inverting input. This causes the output of comparator U20 to go low and a low signal is applied to the switching logic 14. Thus, the transmitter is activated whenever the PTT switch is depressed including the double clicks during switching modes. In VOX operation, the noninverting input of comparator U20 is held at 2.1 volts while the inverting input is held at 0.6 volts. When the voltage at capacitor C8 adds to this 0.6 volts and becomes greater than 2.1 volts, the comparator output is forced low and a low signal is applied to the switching logic 14.

The integrated voltage at capacitor C8 that is the result of the PLL locking onto periodic pulse trains is the key to correct operations of the VOX system. Because these pulse trains repeat at regular intervals in human speech patterns, capacitor C8 is charged by the periodic pulses and is always reintegrated by subsequent pulses before its voltage falls below the threshold of the comparator U20. When speech signals are removed, capacitor C8 is allowed to return to a lower value as set by resistors R13, R14, R16, R15, and R19. The time duration before capacitor C8 is allowed to return to its lower value and thus return the output of comparator U20 to a high value, is set in a range of two to three seconds to prevent premature drop-out of VOX transmission (i.e., the VOX transmission should not break up during the brief pauses in the typical speech pattern). Feedback resistor R17 is used to generate hysteresis so that the comparator U20 responds with a positive snap action.

To return to the PTT mode, if the control system is in the VOX mode and the PTT switch is quickly depressed two times, the Q2 output of counter U24 again goes high which changes the Q output of U 25 to a low state. This low state, brings the input current to operational amplifier U10 to circuit ground, thereby rendering it non linear. The negative going pulses from the second inverter U23 are again coupled to drive the output of bias supply U21 to a low state. These pulses, in turn, cause the output of the comparator U20 to go low as the pulses go low. Thus the output of comparator U20 goes low two times for the duration of the PTT switch closure. The output of the comparator U20 is in turn used to activate the switching transistor indicated by switch logic which will place the transmitter in the PTT mode.

If the control system is in the PTT mode, and the PTT switch is quickly depressed only once or for greater than 500 milliseconds, the Q2 output of counter U 24 does not go high and thus there is no change in the high level at the Q output of U25. The high level at the Q output of U25 maintains the operational amplifier U10 in non linear operation thus keeping the VOX mode disabled. The low signal from U23 during the depression of the PTT switch produces a low signal at the output of comparator U20 for actuation of the switching logic 14 to enable PTT transmission.

The output of the comparator U20 is designed to switch an external device such as a p-channel MOS FET or an n-channel MOS FET. For example, a p-channel FET may be connected between the V+ source and the transmitter circuitry with the gate of the p-channel FET coupled to the logic terminal 14. When the output of comparator 20 goes low, the p-channel FET switches on and power is applied to the transmitter circuit. Simultaneously, the same logic may be used to switch the receiver circuitry power. In this case, an n-channel FET may be connected between the V+ source and the receiver circuitry with the gate of the n-channel FET coupled to the logic terminal 14. When the comparator goes high, the n-channel FET switches on and power is applied to the receiver circuitry.

THE ALTERNATE EMBODIMENT OF FIG. 2

The embodiment of FIG. 2 provides control of a third function (i.e., a function in addition to controlling PTT operation and VOX operation) through a third quick depression of the PTT switch. The communication system may be switched between VOX operation and PTT operation by two quick depressions of the PTT switch within a predetermined time as in the embodiment of FIG. 1. In addition, three quick depressions of the PTT switch within the predetermined time will provide an additional control signal that may be used to switch the communication system between high and low frequency operation (or to accomplish another function, if desired).

To reduce complexity of the drawing, the components which relate only to the frequency-selective aspect of VOX operation have not been included in the schematic drawing of FIG. 2; however, these components and the frequency selective circuitry are understood to be part of the alternative embodiment. Referring now to FIG. 2 (wherein similar (identical) components are identified by the same reference characters as in FIG. 1), additional circuitry in the alternate embodiment and differences between the alternative embodiment and the embodiment of FIG. 1 will now be described.

The circuitry associated with the PTT switch, has been modified to ensure that the voltage potential between the PTT signal terminal 16 and the PTT return terminal 18 is also very small. Because the voltage potential is very small, the possibility that the PTT switch may be effectively actuated by electrolysis through the sea water is virtually eliminated. This allows the PTT terminals 16 and 18 to be immersed in sea water. The virtual elimination of the possibility of electrolysis through sea water, thereby eliminates the need for expensive rubber molded connectors to keep the sea water from the PTT terminals 16 and 18.

The PTT switch circuitry includes an NPN transistor Q2 having its base and emitter coupled to circuit ground through forward biased diodes CR7 and CR8, and forward biased diodes CR9 and CR10, respectively. The emitter of transistor Q2 is also coupled through a small resistor R37 (560 ohms) to the PTT signal terminal 16. The base of transistor Q2 is also coupled through a resistor R38 to the circuit V2 supply voltage. This results in the PTT signal terminal 16 being connected to the PTT return terminal 18 through the small resistor R37 and the forward biased diodes CR7 and CR8 in parallel with the base-emitter circuit of transistor Q2 to provide the required very small potential difference. The collector of transistor Q2 is connected to supply voltage V2 via resistor R20 and capacitor C9, and connected in parallel to the input of inverter U22.

One two input of Nand gate U31 is coupled to receive the output of the first inverter U22 (which is also the clock input to the counter U24). The and the Q2 output of counter U24 is connected to the other input of NAND gate U31. When the PTT switch is depressed three times within the reset period of monostable multivibrator U27, there is a brief crossover point (during the third depression) when both inputs to Nand gate U31 are high. The resulting low output pulse from U31 is passed on to the inputs of a second two input Nand gate U32 to produce a similar low output at Nand gate U32. A capacitor C31 is provided between the output of Nand gate U32 and circuit ground to slow down the fall and rise times of the logic pulse at the output of NAND gate U32. The output pulse from Nand gate U32 is coupled to the clock input CP of flip flops U33 and U34.

The Q output of flip flop U33 is used for the selection of the third function. Any transistor switch, relay driver or the like can be used in conjunction with this output to perform an on-off function for the purpose of controlling additional circuitry.

Once the diver has selected VOX or PTT, this selection must be preserved in the event the diver depresses the PTT switch three times within the period of monostable multivibrator U27 to select the third function. When these three depressions occur, flip flop U25 will receive the Q2 output from the counter U24 which will change the state of U25, thus changing the diver's current selection. However, in this embodiment, flip flop U34 and the associated circuitry effectively overrides the counter U24 signal and operates to preserve the current PTT/VOX selection when the third function is selected.

That is, the $\overline{Q}$ output of flip flop U34 is coupled via a reverse biased diode CR11 and a resistor R39 to the V2 supply and via the diode CR11 to a capacitor C32 and resistor R40 for differentiating the $\overline{Q}$ output to generate a clock pulse. The clock pulse is applied to the clock (CP) input to flip flop U25 to reset flip flop U25 back to its initial logic state after the PTT switch has been depressed three times (since the first two depressions will have changed the state of U25).

In the embodiment of FIG. 1, only the Q2 output of the counter U24 was coupled to this clock input of flip flop U25. In the three function embodiment of FIG. 2, the Q2 output of the counter U24 is coupled to the clock input of U25 via a forward biased diode CR12. The diode CR12 isolates the Q2 output of counter U24 from the clock pulse initiated in flip flop flip flop U34 to ensure that the clock pulse from U34 is not shorted through the low condition of the counter's Q2 output.

Thus the pulse from Nand gate U32 generates a logical output at flip flop U33 which is supplied to third function output terminal 150 to control the third function. The NAND gate U32 also generates a pulse from flip flop U34 (via CR11, R39 and C32) to reset flip flop U25 to restore (or retain) the PTT/VOX selection to the diver's current selection.

Because the VOX/PTT setting is momentarily switched during a three depression sequence, the short/long tone generated in the annunciator circuit of FIG. 1 must be blocked. The embodiment of FIG. 2 modifies this annunciator circuit so that generation of the VOX/PTT tone is delayed. Accordingly, the Q2 output of counter U24, which is set upon the second depression of the PTT switch, is coupled to a monostable multivibrator U35 to trigger the multivibrator.

The one-shot period of the monostable multivibrator U35 produces a logical low at the $\overline{Q}$ output of multivibrator U35 which is coupled to the positive trigger input the monostable multivibrator U28. In the embodiment of FIG. 1, the monostable multivibrator U28 was triggered directly by the Q2 output of counter U24. Thus, multivibrator U28 is now triggered after a delay corresponding to the period of the monostable multivibrator U35 when the $\overline{Q}$ output of multivibrator U35 goes high.

The "time out" period of the one shot multivibrator U35 is selected to be greater than the time of the first monostable multivibrator U27 which sets the basic 500 millisecond window for consecutive depressions of the PTT. The period of the monostable multivibrator U35 is set by resistor R41 and capacitor C33.

The pulse produced at the output of Nand gate U32 (which has been coupled to flip flops 33 and 34) is also coupled to Nand gate U36 to provide a pulse for triggering monostable multivibrator U37. When the PTT switch is depressed a third time within the 500 millisecond time period of the monostable multivibrator U27, the output of Nand gate U36 goes through a low-to-high transition which enables the multivibrator U37 to provide a one-shot pulse.

The $\overline{Q}$ output goes low and is coupled to the CD (chip disable) input of the monostable multivibrator U28 to disable the multivibrator U28. This prevents the VOX/PTT annunciator from operating when there have been three depressions of the PTT switch within the 500 millisecond window.

Concurrently, the Q output of multivibrator U37 is coupled to one input of Nand gate U38 to enable a frequency select audio annunciator tone generator. The output of the Nand gate U38 is coupled via resistor R42, resistor R43 and capacitors C34 (coupled between R42 and R43 to circuit ground) and C35 to the audio annunciator terminal 20.

A p-channel FET Q3 changes the pitch of the tone in response to the gate voltage received from the Q output of flip flop U33. (This logical output signal from U33 is also used for selection of the third function). The source of FET Q3 is coupled to the second input of the Nand gate U38 and to circuit ground through capacitor C36. The drain of transistor Q3 is coupled through a resistor R44 to the output of gate U38 and through resistor R44 and resistor R45 back to the source. The change between a one or a zero (i.e., high or low signal) on the Q output of flip flop U33 (which toggles between logical one or zero every time a triple click occurs) will determine how long FET Q3 conducts. This will in turn determine the frequency of the tone. In this case, a low pitch tone corresponds to a low frequency and a high pitch tone corresponds to a high frequency.

It is noted that flip flop U25 controls the selection of VOX or PTT operation in the preferred embodiments. However, it could, of course, be used for different switching tasks such as switching functions on a diver's computer or underwater movie lights and the like. In addition, it will be recognized that a separate momentary contact switch (other than the PTT switch) may be employed within the concepts of the present invention to switch additional functions.

It is noted that subsequent momentary closures of the PTT switch after the initial two closures utilized in the present embodiment within the reset period of monostable multivibrator 27 will produce sequential output signals at the Q3–Q7 outputs of the counter U24. These output signals may be applied to other devices or the like to accomplish other logical functions. It is further noted that care must be taken to maintain the control system in the current mode of operation (i.e., PTT or VOX or high frequency-low frequency operation) through appropriate logic circuitry.

While the preceding description has been directed to particular embodiments, it is understood that those skilled in the art may conceive modifications and/or variations to the specific embodiments and described herein. Any such modifications or variations which fall within the preview of this description are intended to be included therein as well. It is understood that the description herein is intended to be illustrative only and is not intended to limit the scope of the invention. Rather the scope of the invention described herein is limited only by the claims appended hereto.

I claim:

1. In a control system for a diver communication system comprising, a push-to-talk transmission mode circuit, a voice operated transmission mode circuit, a momentary contact switch, and electronic means for switching between said push-to-talk transmission mode circuit and said voice operated transmission mode circuit on closure of said momentary contact switch at least two times within a first predetermined period of time.

2. The control system recited in claim 1 including:

means for providing a first audio signal indicating when said communication system is switched between said push-to-talk transmission mode circuit and said voice operated transmission mode circuit.

3. The control system recited in claim 1 wherein, said electronic means for switching comprises:
  means for providing a control signal for use in said diver communication system upon actuation of said momentary contact switch at least three times within said first predetermined period of time.

4. The control system recited in claim 3 including:

means for providing a second audio signal in response to said control signal.

5. The control system recited in claim 1 including, a first frequency operation mode circuit a second frequency operation mode circuit, and means for switching between first frequency operation mode circuit and second frequency operation mode circuit upon closure of said momentary contact switch at least three times within said first predetermined period.

6. The control system recited in claim 5 including:

means for providing a first audio signal indicating when said communication system is switched between said transmission mode circuits; and means for providing a second audio signal indicating when said communication system is switched between said first and second frequency operation mode circuits.

7. The control system as recited in claim 1 wherein, said electronic means for switching includes:
  a counter coupled to said momentary contact switch for producing an output signal when said momentary contact switch is actuated at least two times in said first predetermined period of time; and
  a monostable multivibrator coupled to said momentary contact switch for providing a signal to reset said counter after a second predetermined period of time, said second predetermined period of time being greater than said first predetermined period of time.

8. The control system recited in claim 5 wherein, said electronic means for switching and said means for switching include:
  a counter coupled to said momentary contact switch for producing an output signal when said momentary contact switch is actuated two times,
  a monostable multivibrator coupled to said momentary contact switch for providing a signal to reset said counter after a second predetermined period of time which is greater than said first predetermined period of time; and
  means for combining said output signal from said counter and the signal from said momentary contact switch to provide a control signal for switching between said first frequency operation mode circuit and said second frequency operation mode circuit.

9. The control system recited in claim 1 including, means for receiving an audio frequency signal containing voice signals to be transmitted;

means for detecting voice signals in said audio frequency signal received by said means for receiving;

means for providing an output signal when voice signals are detected by said means for detecting for a second predetermined period of time, said output signal coupled to enable said voice operated transmission mode circuit for said second predetermined period of time; and means for maintaining said output signal for a third predetermined period of time after said voice signals have ceased being detected by said means for detecting thereby to maintain said voice operated transmission mode circuit enabled for said third predetermined period of time after said second predetermined period of time.

10. The control system recited in claim 9 wherein, said means for detecting includes means for detecting voice signals in the vowel frequency spectrum of speech.

11. The control system recited in claim 9 wherein, said means for detecting includes:
  phase locked loop means for producing a pulse train when said voice signals are in the vowel frequency spectrum.

12. The control system recited in claim 11 including, means for filtering said audio signals to remove frequencies not in the vowel frequency spectrum of speech.

13. The control system recited in claim 11 including, means for filtering said pulse train to remove signals that are not produced by said voice signals in the vowel spectrum of speech.

14. The control system recited in claim 2 wherein, said means for providing a first audio signal includes,
  means for providing a tone burst of a first duration when said control system enters voice operated transmission mode and a tone burst of a second duration when said control system enters push-to-talk transmission mode.

15. The system recited in claim 1 including, a monostable multivibrator coupled to said momentary contact switch to be triggered by a momentary output signal of said momentary contact switch, said monostable multivibrator providing an output signal of a first duration of time when triggered; and a counter having a signal input coupled to received the output signal of said momentary contact switch and a reset input coupled to receive the output signal of said monostable multivibrator thereby to count the number of times said monostable multivibrator is triggered.

16. The system recited in claim 1 wherein, said momentary contact switch includes a signal terminal and a return terminal, and means for limiting the voltage potential difference between said signal terminal and said return terminal to a value sufficiently small to minimize electrolysis through the water.

17. The control system recited in claim 9 wherein, said means for providing an output signal includes means for integrating said pulse train to provide said output signal.

18. The control system recited in claim 9 wherein, said means for maintaining said output signal for a third predetermined period of time includes means for maintaining said output signal for said fourth predetermined period of time after said pulse train ceases to be produced by said phase locked loop means.

19. The control system recited in claim 9 wherein, said means for providing an output signal includes means for integrating said pulse train to provide said output signal, and said means for maintaining said output signal for a third predetermined period of time includes means for maintaining said output signal for said fourth predetermined period of time after said pulse train ceases to be produced by said phase locked loop means.

20. A control system for selectively activating a transmitter and a receiver in a communication system having voice-operated transmission and push-to-talk transmission comprising:

receiver means for receiving an audio frequency signal containing voice signals to be transmitted;

detection means coupled to said receiver means for detecting voice signals in said audio frequency signal;

means for providing an output signal having a first signal level when said detected voice signals are present for a first predetermined period of time whereby said transmitter is activated when said output signal is at said first signal level;

first means for maintaining said output signal at said first signal level for a second predetermined period of time after said voice signals have ceased being detected by said means for detecting;

manually actuated means for providing a momentary signal;

second means for maintaining said output signal at said first signal level when said manually actuated means is actuated; and means for providing said output signal at a second signal level when said signal is not maintained at said first signal level by said first and second means whereby said receiver means is activated when said signal is at said second signal level.

21. The control system recited in claim 20 including, means for selectively preventing said output signal at said first signal level.

22. The control system recited in claim 21 wherein, said means for selectively preventing said output signal at said first signal level comprises means for selectively switching said receiver means between a disabled state and an enabled state to prevent said audio frequency signals from reaching said detection means.

23. The control system recited in claim 22 wherein, said detection means includes:

phase locked loop means for producing a pulse train when said voice signals in the vowel frequency spectrum of speech are present in said audio frequency signal;

integrator means for integrating said pulse train to provide an integrated signal;

means for maintaining said integrated signal for said second predetermined period of time after said pulse train ceases to be produced by said phase locked loop; and means for providing said output signal at said first signal level when said integrated signal reaches a predetermined signal level.

24. The control system recited in claim 22 wherein, said means for selectively switching said receiver means between a disabled state and an enabled state is actuated by said manually actuated means providing a momentary signal two times within a third predetermined period of time.

25. A control system for selectively activating a transmitter and a receiver in an underwater communication system having selective voice-operated transmission and push-to-talk transmission of voice signals comprising:

an audio frequency amplifier having an input and an output, said audio frequency amplifier coupled to receive an audio input from an audio input device;

a phase locked loop circuit coupled to the output of said audio frequency amplifier for producing a pulse train when voice signals in the vowel frequency spectrum of speech are present in the output from the audio frequency amplifier;

means for integrating said pulse train to provide an integrated output signal; and a comparator for producing a control output signal of a first level when said integrated output signal is at least a predetermined value and of a second level when said integrated output signal is less than said predetermined value, said transmitter being activated when said control output signal is of said first level and said receiver being activated when said control output signal is at said second level.

26. The control system recited in claim 25 including:

a momentary contact switch for providing a manual control signal of said first level to said comparator when actuated;

a monostable multivibrator coupled to said momentary contact switch to be triggered by a manual control signal of said momentary contact switch and produce an output signal of a first duration of time when triggered; and a counter having a clock input, a reset input and a plurality of outputs, said clock input coupled to receive the output of said momentary contact switch, said reset input coupled to receive the output of said monostable multivibrator.

* * * * *